(12) United States Patent
Hartley

(10) Patent No.: US 6,669,135 B1
(45) Date of Patent: Dec. 30, 2003

(54) REEL ARRANGEMENT WITH DETACHABLE DRIVE MEANS

(76) Inventor: Brian Hartley, 12, Oakley Ave., Brockwell, Chesterfield (GB), S40 4DS ( * ) Notice: Subject to any disclaimer, the term of this patent is extended or adjusted under 35 U.S.C. 154(b) by 0 days.

(21) Appl. No.: 09/674,198

(22) PCT Filed: Apr. 28, 1999

(86) PCT No.: PCT/GB99/01319

§ 371 (c)(1),
(2), (4) Date: Oct. 27, 2000

(87) PCT Pub. No.: WO99/55613

PCT Pub. Date: Nov. 4, 1999

(30) Foreign Application Priority Data

Apr. 28, 1998 (GB) .............................................. 9808928
Sep. 8, 1998 (GB) .............................................. 9819429

(51) Int. Cl.[7] .............................................. B65H 75/40
(52) U.S. Cl. ................. 242/390.9; 242/397; 242/399.2; 242/406; 191/12.2 A
(58) Field of Search .......................... 242/390.9, 390.8, 242/390.6, 399.2, 404, 404.2, 397, 397.2, 406; 191/12.2 A

(56) References Cited

U.S. PATENT DOCUMENTS

| | | | | |
|---|---|---|---|---|
| 1,537,702 A | * | 5/1925 | Rottgardt | 242/390.8 |
| 3,719,331 A | * | 3/1973 | Harsch | 242/390.8 |
| 3,788,575 A | * | 1/1974 | Boettcher | 242/85.6 R |
| 3,799,005 A | * | 3/1974 | Koehler | 74/812 |
| 3,937,415 A | * | 2/1976 | Prinz | 242/106 |
| 4,085,904 A | | 4/1978 | McElroy | |
| 4,365,768 A | * | 12/1982 | Woodruff | 242/86.7 |
| 4,442,984 A | * | 4/1984 | Bayat | 242/106 |
| 4,454,999 A | * | 6/1984 | Woodruff | 242/86.5 R |
| 4,721,833 A | * | 1/1988 | Dubay | 191/12.4 |
| 4,830,300 A | * | 5/1989 | Taylor | 242/54 |
| 4,893,037 A | * | 1/1990 | Schwartz | 310/68 B |
| 5,170,581 A | * | 12/1992 | Lyons | 43/43.12 |
| 5,775,473 A | * | 7/1998 | Cordero | 191/12.2 A |
| 5,836,536 A | * | 11/1998 | Bodden | 242/390.5 |
| 5,862,885 A | * | 1/1999 | Carmitchel | 187/231 |
| 6,149,096 A | * | 11/2000 | Hartley | 242/390.9 |

FOREIGN PATENT DOCUMENTS

| | | |
|---|---|---|
| DE | 91 13 882 | 1/1992 |
| DE | 196 21 490 | 9/1997 |
| EP | 0 149 072 | 7/1985 |
| GB | 2 292 933 | 3/1996 |

* cited by examiner

*Primary Examiner*—John M. Jillions
(74) *Attorney, Agent, or Firm*—Smith-Hill and Bedell

(57) ABSTRACT

A reel (10), particularly for an electric cable (12), has a rotatable drum (14) supported at (16) and optionally swivel-mounted on a plinth (30) or other member. A removable motor module (60) can be attached to convert the drum to a motorized reel controlled by a switch (82), which allows the user to rewind the cable (12) onto the drum (14), when required.

12 Claims, 6 Drawing Sheets

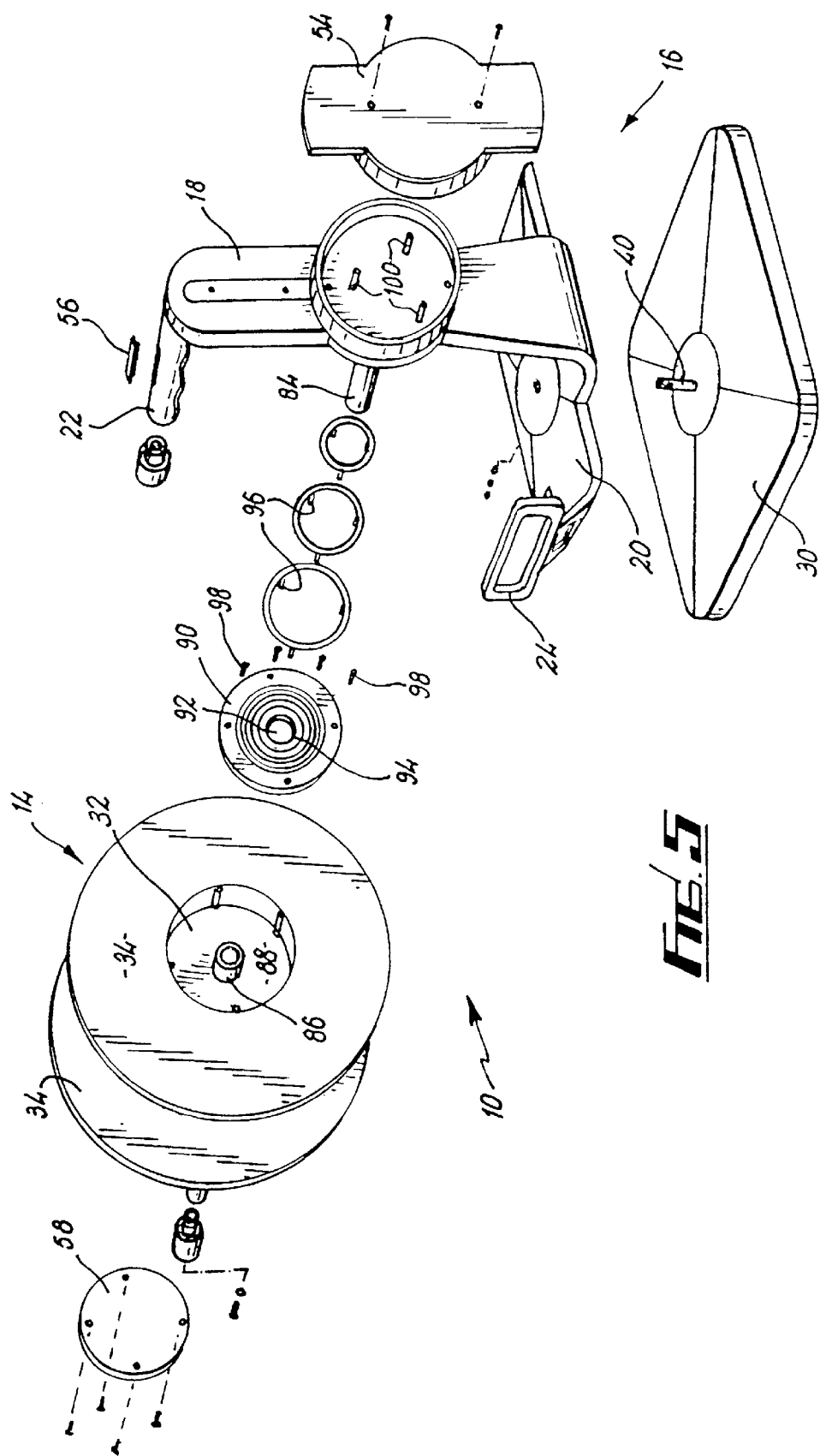

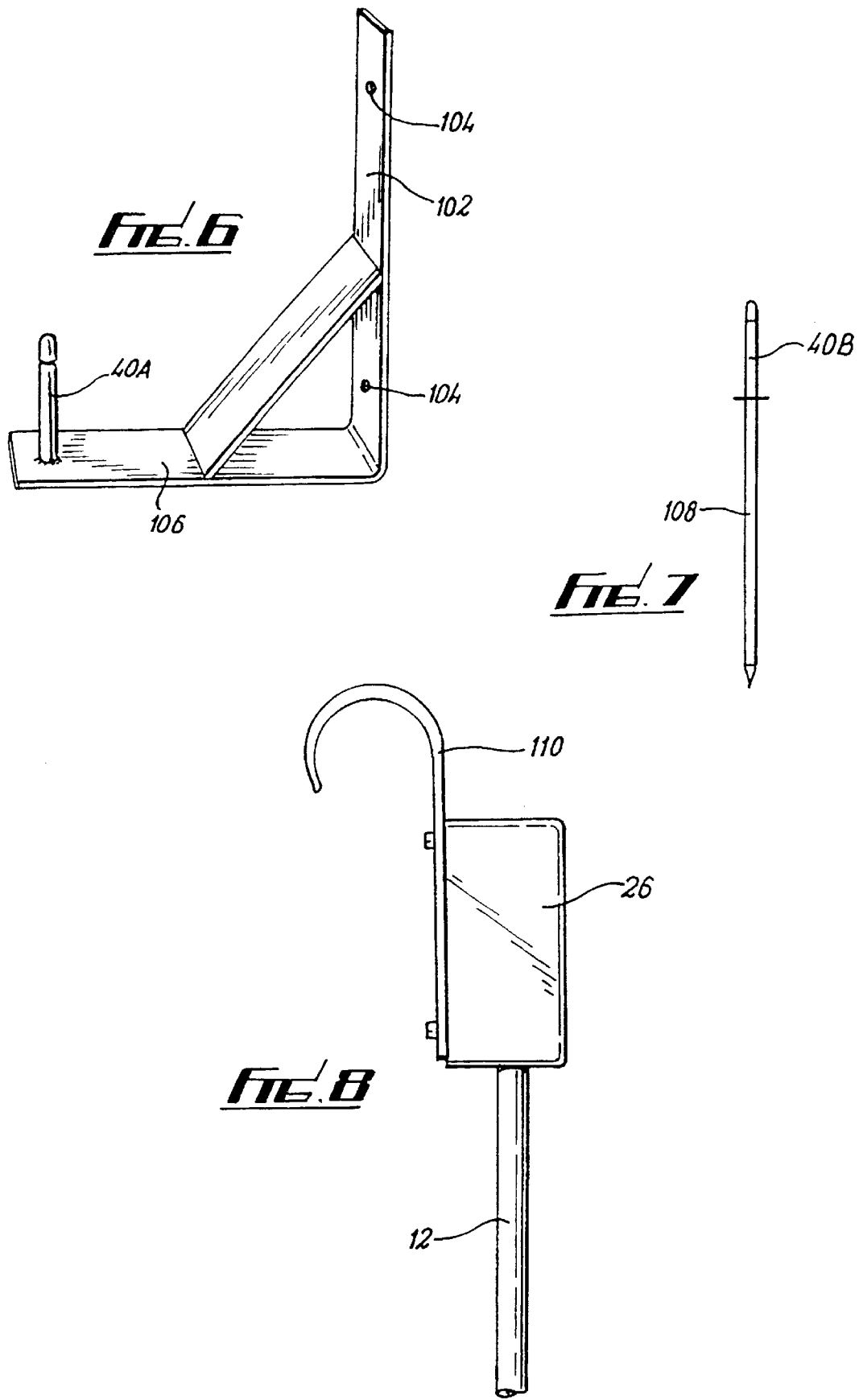

REEL ARRANGEMENT WITH DETACHABLE DRIVE MEANS

The present invention relates to reels for elongate members and in particular, but not exclusively, to reels for electric cable.

Several types of reel have been proposed, particularly for extension cables. A simple version consists of a drum with cable wound around it, the cable having a plug fitted to one end and a socket fitted to the other end and the cable being manually wound onto the drum when not in use. This can be time-consuming. An alternative proposal uses springs to rewind the cable when not in use, but this arrangement has been found to be very heavy and vulnerable to malfunction, particularly if the spring breaks or wears.

Prior patents U.S. Pat. No. 4,085,904 and GB2292933 both disclose reels capable of being electrically driven.

The invention seeks to provide an improved reel arrangement.

The invention provides a reel arrangement comprising a rotatable member onto which an elongate member may be wound and from which it may be unwound, and a support means on which the rotatable member is mounted, the arrangement further comprising a drive means selectively attachable or detachable for cooperation with the reel, the rotatable member being rotatably driveable relative to the support means by the drive means when the drive means is attached, and the rotatable member being manually rotatable relative to the support means when the drive means is not attached, wherein the support means comprises a hub by which the rotatable member is supported for rotation, the hub comprising a chamber for receiving the drive means.

The drive means and the rotatable member preferably comprise interfitting portions which cooperate when the drive means is attached, thereby providing a mechanical and/or electrical connection between the drive means and the rotatable member. The elongate member is preferably a power cable, the interfitting portions comprising electrical contacts operable to tap power from the cable to provide power to the drive means.

The arrangement may comprise a cover for the chamber when the drive means is absent.

The support means may comprise a frame member which extends upwardly from the hub to provide a handle means for carrying the arrangement. The drive means may comprise a second frame member which extends upwardly from the chamber when the drive means is present, and connects with the handle means.

The handle means is preferably adapted to receive switch means for operation of the drive means when present.

Alternatively, the drive means may be mountable on the support means to drivingly engage the outer extremity of the rotatable member.

The drive means may comprise an electric motor.

The apparatus may further comprise sensor means operable to sense the tension in the elongate member and to control the drive means in accordance therewith. The sensor may comprise a pivotally mounted arm caused to pivot by changes in tension in the elongate member, and switch means operable by the position of the arm to enable or disable the drive means.

The rotatable member and the support means are preferably substantially wholly made of electrically non-conductive material. The electrically non-conductive material may be a plastics material.

Preferably the support means comprises an upwardly extending peg member, the rotatable member being supportable by means of a socket cooperable with the peg member to provide a swivel support therefor.

Preferably the peg comprises a head which is enlarged relative to the peg behind the head, the socket having a spring member associated therewith for engaging behind the head to retain the rotatable member in engagement with the peg member.

The peg member may be arranged to be ground-supported or to be wall-mounted.

The invention also provides a reel arrangement for an elongate member, comprising a rotatable member onto which an elongate member may be wound and from which it may be unwound, and support means on which the rotatable member is mounted, the arrangement further comprising drive means supported by the support means and operable to engage an outer extremity of the rotatable member to drive the rotatable member relative to the support means.

The invention also provides a reel arrangement for an elongate member, comprising a rotatable member onto which an elongate member may be wound and from which it may be unwound, and support means on which the rotatable member is mounted, the support means comprising an upwardly extending peg member and the rotatable member being supportable by means of a socket cooperable with the peg member to provide a swivel support therefor.

Embodiments of the present invention will now be described in more detail, by way of example only, and with reference to the accompanying drawings, in which:

FIG. 5 is an exploded perspective view of the reel;

FIGS. 6 and 7 are perspective views of alternative supports for the reel; and

FIG. 8 is a perspective view of a modified socket for use with the reel.

Figure 1:
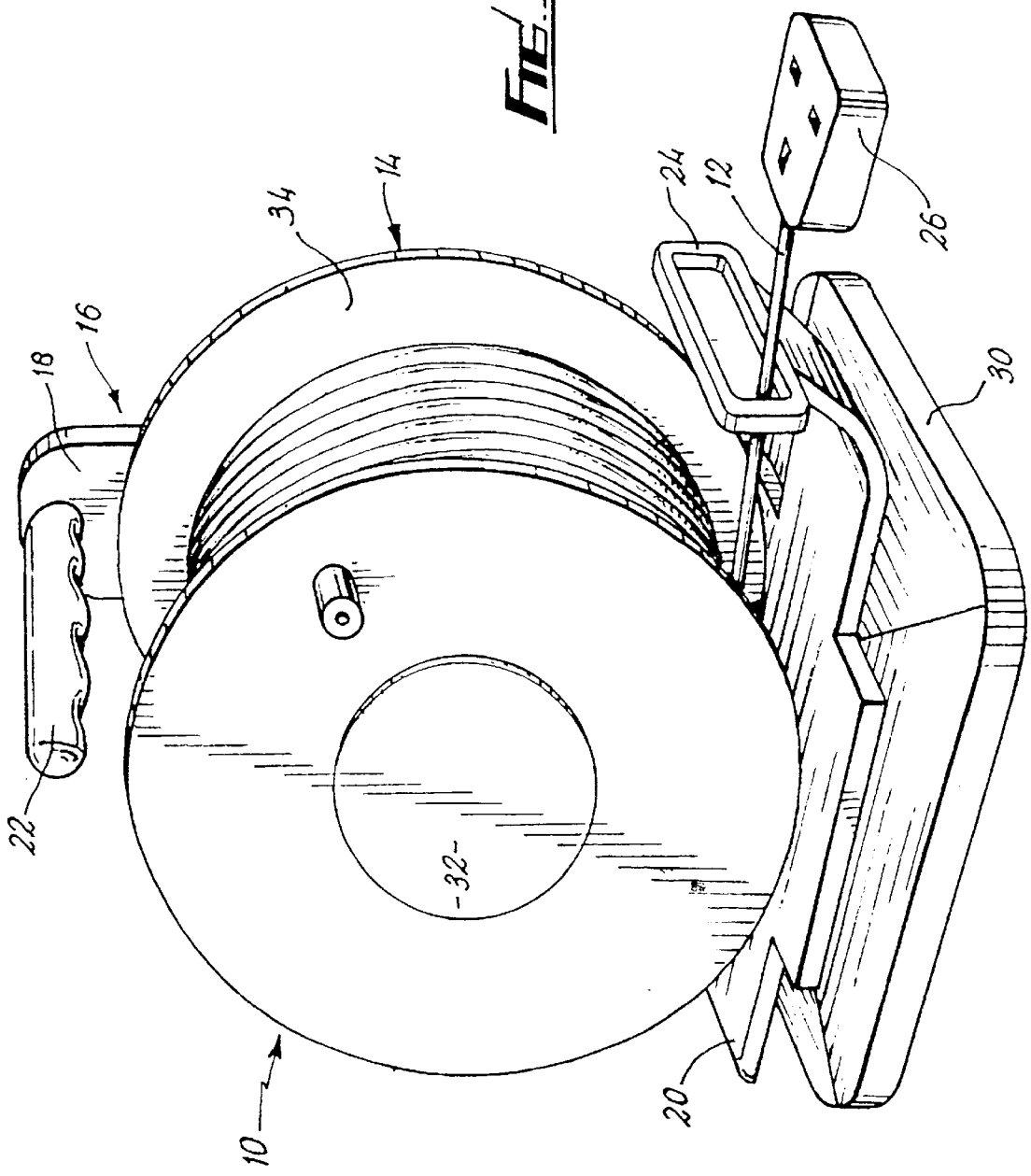
FIGS. 1 and 2 are perspective views of a reel according to the present invention, viewed from either side.

The drawings show a reel arrangement 10 for an elongate member in the form of an electric cable 12,12a. The reel 10 comprises a rotatable drum 14 onto which the cable 12 may be wound, and from which it may be unwound. A support arrangement indicated generally at 16 is provided. The drum 14 is mounted on the support 16. Drive means (not shown in FIG. 1) are also provided and are selectively attachable or detachable (as will be described).

In more detail, the reel comprises a support column 18 which extends generally vertically from a base 20 and supports a handle 22. Part way up the column 18, the column provides a mounting location for supporting the drum 14 to be rotatable about a generally horizontal axis, within the space between the base 20 and the overlying handle 22. Rotation of the drum 14 in this manner allows the cable 12 to be wound onto the drum 14, or unwound from the drum. The cable 12 is threaded through an eye 24 formed in an upturned lip of the base 20, in order to guide the cable 12 during winding and unwinding. One end of the cable 12 carries a socket 26; the other end carries a plug 28, so that the cable 12 can be used as an extension cable, for instance for providing power to portable equipment such as DIY equipment.

Figure 2:
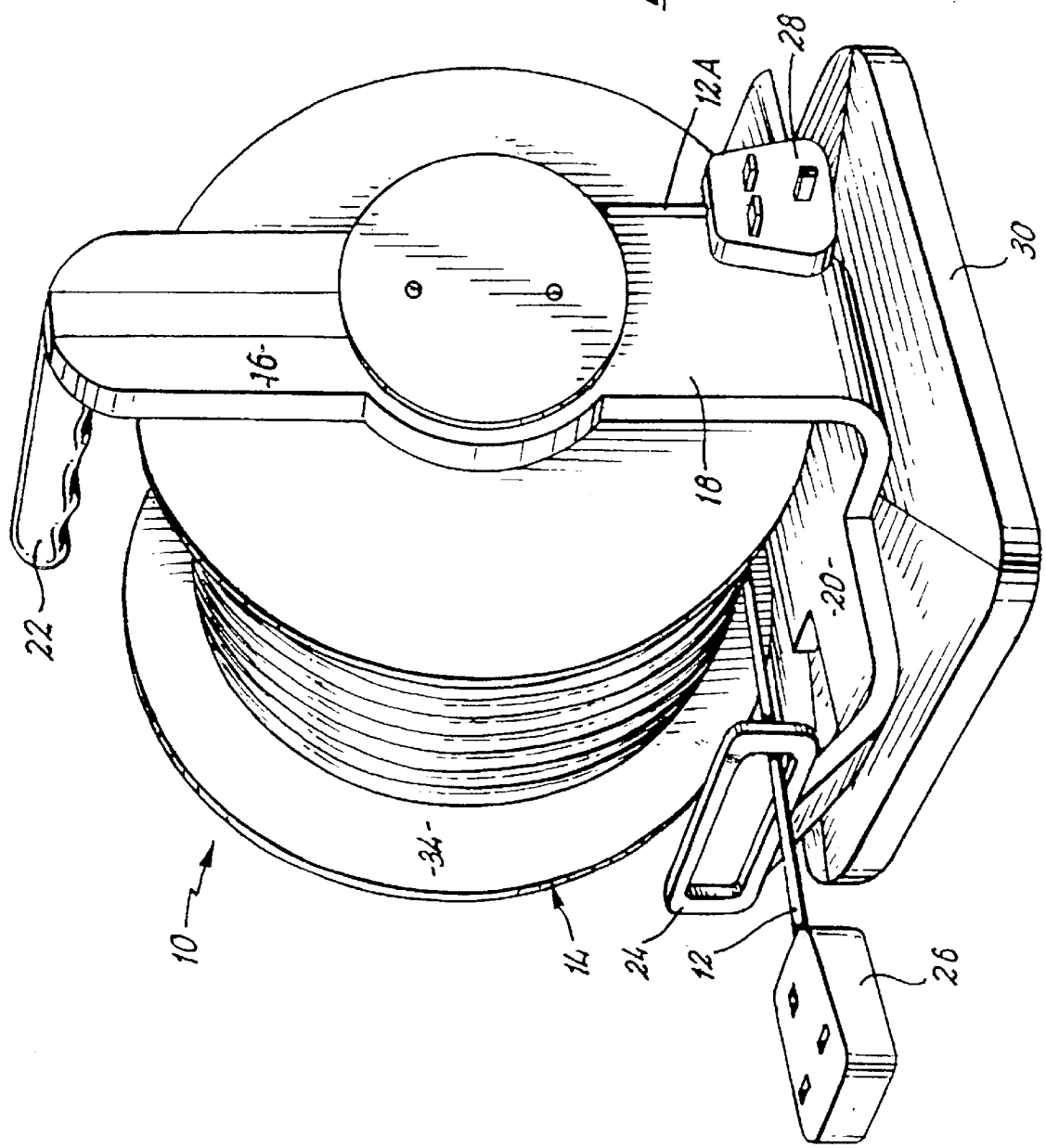

FIGS. 1 and 2 show the reel 10 supported on a plinth 30 by a swivel arrangement to be described, so that the reel 10 can be swivelled around a generally vertical axis, as required. Alternatively, the reel 10 can be removed from the plinth 30, and the base 20 can then be rested directly on the ground.

Figure 3:
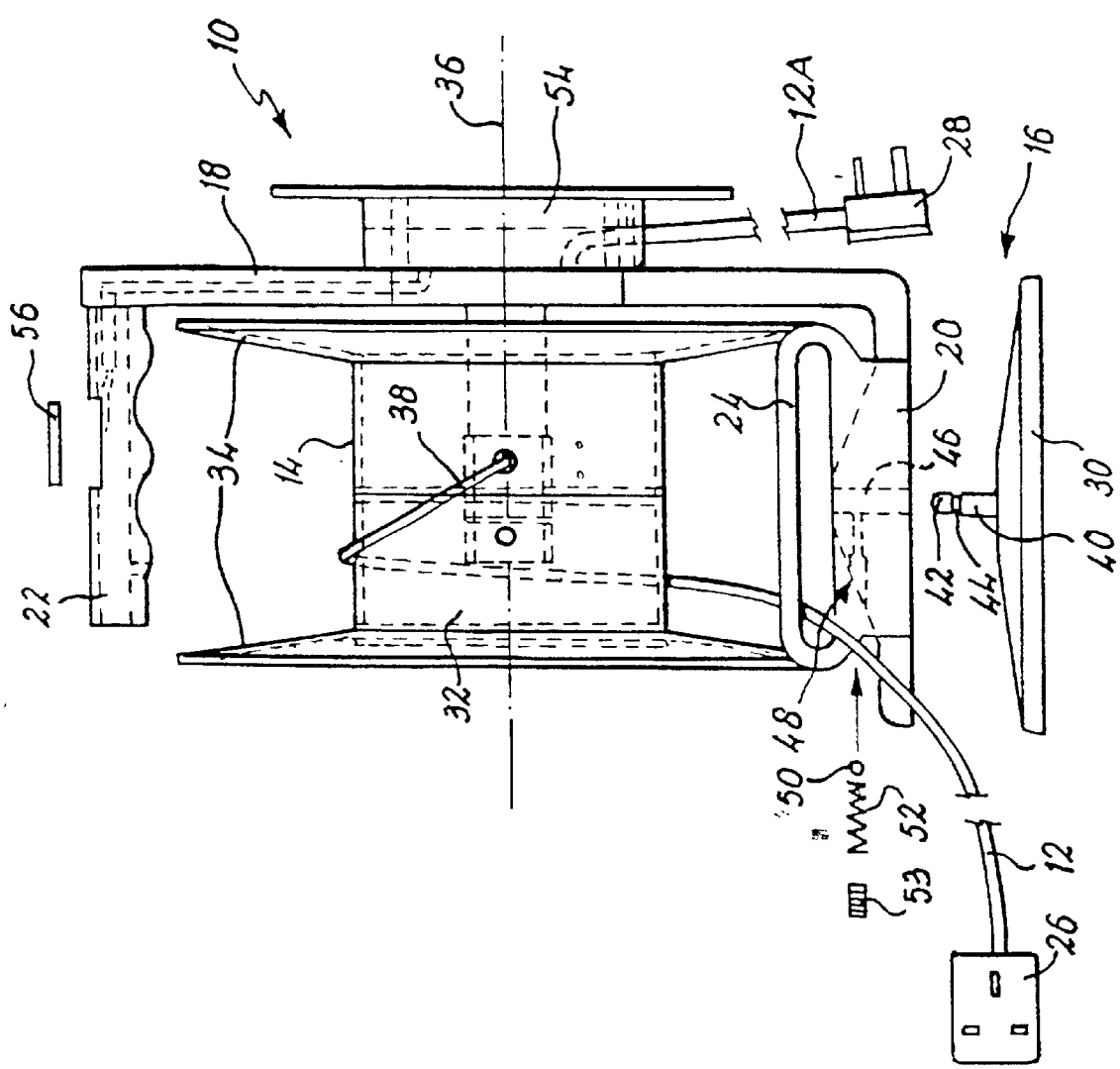
FIGS. 3 and 4 are vertical sections through the reel of FIGS. 1 and 2, shown respectively without and with a motor module.

FIG. 3 illustrates the drum support in more detail.

The drum 14 has a central hub 32 around which the cable 12 can be coiled, being retained between radially extending walls 34. Bearing arrangements between the hub 32 and the column 18 provide for rotatable support of the drum 14 by the column 18. In the condition shown in FIG. 3, the drum 14 is freely turnable about its generally horizontal central axis 36, to wind or unwind cable 12. As can be seen in FIG. 3, a captive end 38 of the cable 12 passes into the hub 32 and is connected within the hub 32 with rotary contacts, to be described, to maintain electrical connection as the drum turns; with a short length 12a of cable. Accordingly, the cable 12 can be wound or unwound without the cable portion 12a being fouled, or requiring to be disconnected.

FIG. 3 shows the reel 10 raised above the plinth 30. The plinth 30 carries a peg 40 which extends generally upwardly from the top of the plinth 30, and has a relatively enlarged head 42, behind which a groove 44 is formed in the peg 40. The base 20 incorporates a cylindrical passage 46 for receiving the peg 40 to form a journal bearing providing a swivel mounting of the base 20 on the plinth 30. A side passage 48 houses a ball 50 (shown exploded from the base 20 in FIG. 3) which is urged to project into the passage 46 by means of a spring 52, held in place by a grub screw 53. This provides a sprung snap-fit connection serving to engage the groove 44 to retain the base 20 on the peg 40 until the bias of the spring 52 is deliberately overcome by pulling the handle 22 up, thereby removing the base 20 from the plinth 30 and allowing the reel 10 thereafter to be placed on the ground. It will be noted that the base 20 has a flat lower face, for stability.

A small drum 54, fixed relative to the column 18, may be provided for storing the cable 12a when not in use.

The column 18, at least above the axis 36, and the handle 22 are provided with a passage for reasons to be described. An aperture formed on the top surface of the handle 22 is covered in FIG. 3 by a removable plug 56. Electrical wires or cables extend from the vicinity of the plug 56, through the handle 22 and column 18 to the drum 54, where they are electrically connected to the cable 12a by a conventional arrangement not illustrated in the interests of clarity.

The arrangement shown in FIG. 3 therefore constitutes a manually operable reel for providing convenient storage for the cable 12 and having the advantages of a handle for carrying, swivel mounting by means of the plinth 30, if desired, and able to coil cable neatly by virtue of the eye 24.

In accordance with the invention, the apparatus of FIG. 3 can be modified for the reel 10 to be driven, as follows.

First, a removable cover 58 which closes the hollow hub 32 is removed to expose the chamber formed within the hub 32. A motor module illustrated generally at 60 is then offered to the arrangement, as follows. The module 60 incorporates a second column 62 which carries a second handle portion 64 at its upper end, and provides a mounting for a motor, preferably an electric motor 66 at its lower extremity. The column 62 and handle portion 64 are hollow.

The motor 66 drives a spindle 68 carrying a collar 70 attached to turn with the spindle 68, for instance by means of one or more grub screws. The collar 70 has a threaded bore 72. The column 62 may be offered to the drum 14 to place the motor 66 within the hub 32, with the spindle 68 aligned with the axis 36 and with the threaded bore 72 in register with an aperture 74 provided through the drum 14. A further screw or grub screw 76 can be passed into the aperture 74 to engage the threaded bore 72, thereby securing the drum 14 to the collar 70, so that the motor 66 may drive the drum 14 for rotation, by turning the collar 70. A gearbox may be provided through which the motor may drive the drum, particularly for speed reduction, if required.

Electric drive current to the motor 66 is provided by wires 78 which extend away from the motor 66 through the column 62 and initially have free ends 80 projecting out of the handle portion 64. Prior to the column 62 being offered to the drum 14, the plug 56 is removed from the handle 22, the free ends 80 are passed into the passage within the handle 22, and an electrical switch 82 is connected to the free ends 80 and to the wires tapping from the cable 12a. The switch is then mounted on the handle 22 in place of the plug D6. The result is to connect the motor 66 to be powered by current from the cable 12,12a when the cable 12 is connected to a power source, with operation of the motor 66 being controlled by operation of the switch 82. The switch 82 maybe a press switch conveniently operated by hand (such as by the thumb) when a user is holding the reel 10 by the handle 22. When the switch 82 is closed, and with the plug 28 connected to power, the motor 66 turns to wind cable 12 onto the drum 14. When the switch 82 is open, the motor is disconnected from power, and acts as a brake, allowing cable to be pulled manually from the reel, against light resistance.

It can be seen that the plug 28 is on the relatively short cable end 12a, allowing the reel 10 to be located close to a public utility supply socket and left there, while cable 12 is played out or recoiled as required.

The reel 10 can be restored to its manual form by disconnecting the switch 82 and the free ends 80, removing the screw 76 to release the collar 70, and removing the module 60, thereafter reinserting the plug 56 and attaching the cover 58.

Figure 4:
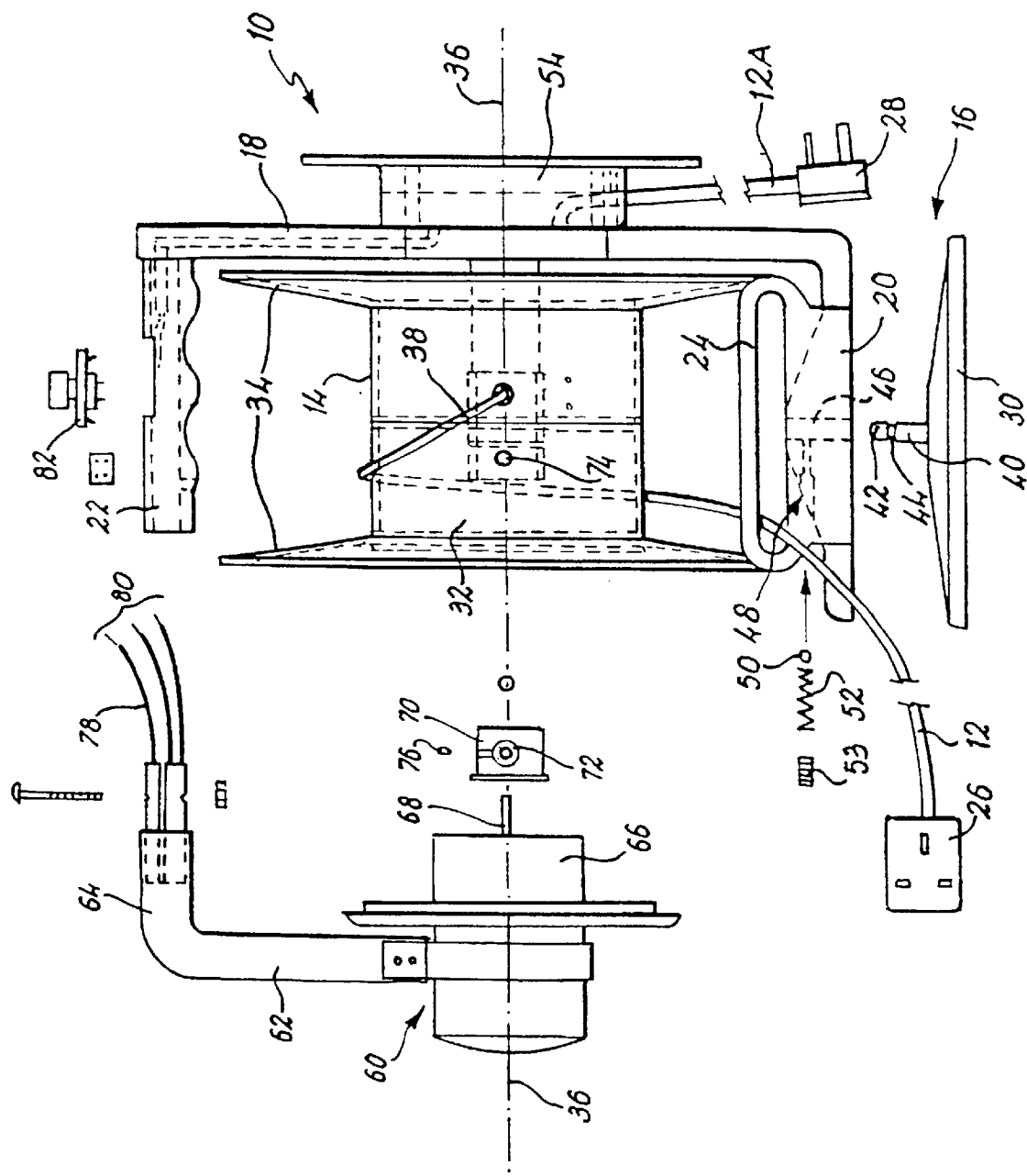

A motor housed within the hub, as shown in FIG. 4, is preferred, but it is readily apparent that many other arrangements could alternatively be used, such as a motor located against an outer extremity of the drum 14, to provide drive at the extremity, such as on the rim of the walls 34.

The eye 24 shown in FIGS. 1 to 4 is fixed in position relative to the base 20 and column 18, but could alternatively be pivotally attached to the base 20 in order to deflect as the cable 12 tightens or relaxes. This deflection could be sensed by means of a switch (such as a microswitch) in order to control the motor 66, to switch off the motor when the cable is taut. The motor would be switched on again when the cable becomes slack, so that any slack cable would then be wound back onto the drum 14.

The above description indicated that rotary contacts were provided for electrical connection between the cables 12,12a. These can be explained more fully with reference to FIG. 5, which is an exploded view of the reel 10, with the cable 12,12a removed. The reel 10 is shown in manual form, without the module 60.

FIG. 5 shows an axle 84 which extends horizontally from the column 18 into a sleeve 86 formed within the hub 32, so that the drum 14 can rotate around the axle 84. The axle 84 and sleeve 86 are relatively narrow in comparison with the diameter of the hub 32, so that a space 88 exists around the sleeve 86. An annular disc 90 has a central hole 92 which fits over the sleeve 86 to place the disc 90 in the space 88. The disc carries three concentric circular tracks 94, each mounted on the disc 90 by means of mounting legs 96 and all being concentric with each other and with the disc 90 and with the sleeve 86. Attachment screws 98 fix the disc 90 to the hub 32, so that the disc 90 and tracks 94 will turn with the drum 14.

Electrical connection to the tracks 94 is completd by three rods 100 mounted on the column 18 and sprung (by springs not shown in FIG. 5) to be urged into contact with the tracks 94. The rods 100 are located at respective distances from the axis 36, corresponding to the radii of the tracks 94, so that each rod 100 makes electrical contact with a respective track 94. This contact is retained as the disc 90 turns and good electrical contact is ensured by means of the spring bias. Thus, the rods 100 provide fixed (non-rotating) contacts by which the cable 12a can be put into electrical contact with the cable 12, which is rotating as the drum 14 turns.

FIGS. 6 to 8 show various modifications which can be used optionally with a reel according to the invention.

FIG. 6 shows a bracket 102 which can be wall-mounted by means of apertures 104. A peg 40A is attached to the horizontal arm 106 of the bracket 102 to stand upright when the bracket 102 is wall-mounted. The peg 40A is of the same design as the peg 40, to provide a swivel, snap-fit support for the reel.

FIG. 7 shows a stake 108 for driving into the ground, and supporting a further peg 40B, like the pegs 40,40A, to provide a swivel, snap-fit support in like manner.

FIG. 8 shows a modification of the socket 26 in which a hook 110 is attached. This allows the socket 26 to be hung from a convenient support, such as a rung of a ladder. When the socket 26 is supported in this way, an operator is not required to support the weight of cable between the reel 10 and the socket 26, but only the length between the socket 26 and the equipment being powered through the socket.

It will be apparent that very many variations and modifications to the apparatus described can be devised without departing from the scope of the present invention. In particular, the modular nature of the motor could be embodied in many different forms, while retaining the ability to replace or remove the motor, according to the requirement for manual or motorised operation. It is particularly advantageous to provide appropriate interfitting portions to cooperate to provide mechanical and electrical connections when the module is installed. It is preferred that the entire arrangement (other than components required to conduct electrical current) are made of electrically non-conductive material, such as plastics, in the interests of safety and of production costs.

Some aspects of the apparatus described above can advantageously be used with a conventional reel with minimal modification. In a conventional reel, the free end of the cable usually carries a plug, with the reel providing a mounting for a socket. The reel could be adapted for swivel mounting, in the manner described, on a peg as described, whether the peg is supported by a plinth, wall bracket or ground spike.

The eye 24 could also be used with a conventional reel being rewound manually.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A reel arrangement for an elongate member, comprising:
   a rotatable member onto which an elongate member may be wound and from which it may be unwound,
   a support means on which the rotatable member is mounted for rotation, and
   a drive means selectively attachable to and detachable from both the support means and the rotatable member as a distinct unit, the rotatable member being rotatably driveable relative to the support means by the drive means when the drive means is attached, and the rotatable member being manually rotatable relative to the support means when the drive means is not attached,
   and wherein the support means comprises a column member, an axle that projects from the column member, and a first frame member that extends upward from the axle to provide a handle means for carrying the arrangement,
   the rotatable member includes A hub that receives the axle, whereby the rotatable member is mounted on the support means,
   the hub defines a chamber for receiving the drive means when the drive means is attached,
   and the drive means comprises a second frame member that extends upward from the chamber when the drive means is attached and connects with the handle means.

2. An arragement according to claim 1, wherein the drive means and the rotatable member comprise interfitting portions which cooperate when the drive means is attached, thereby providing a functional connection between the drive means and the rotatable member.

3. An arrangement according to claim 1, wherein the elongate member is a power cable and the arrangement comprises electrical contacts operable to tap power from the cable to provide power to the drive means when the drive means is attached.

4. An arrangement according to claim 1, wherein the arrangement further comprises a cover for the chamber when the drive means is detached from the rotatable member.

5. An arrangement according to claim 1, wherein the handle means is adapted to receive a switch means for operation of the drive means when attached.

6. An arrangement according to claim 1, wherein the drive means comprises an electric motor.

7. An arrangement according to claim 1, further comprising a sensor means operable to sense tension in the elongate member and to control the drive means in accordance therewith.

8. An arrangement according to claim 7, wherein the sensor means comprises a pivotally mounted arm caused to pivot by changes in tension in the elongate member, and a switch means operable by the position of the arm to enable or disable the drive means.

9. An arrangement according to claim 1, wherein the rotatable member and the support means are substantially wholly made of electrically non-conductive material.

10. An arrangement according to claim 9, wherein the electrically non-conductive material is a plastics material.

11. An arrangement according to claim 1, wherein the support means comprises an upwardly extending peg member, the rotatable member being supportable by means of a socket cooperable with the peg member to provide a swivel support therefor.

12. An arrangement according to claim 11, wherein the peg member comprises a head which is enlarged relative to the neck portion of the peg member, the neck portion being behind the head, the socket having a spring member associated therewith for engaging the neck portion to retain the rotatable member in engagement with the peg member.

* * * * *